United States Patent [19]

McGilvery

[11] 4,276,273
[45] Jun. 30, 1981

[54] PRODUCTION OF SODIUM POLYPHOSPHATES

[75] Inventor: James D. McGilvery, Etobicoke, Canada

[73] Assignee: ERCO Industries Limited, Islington, Canada

[21] Appl. No.: 176,657

[22] Filed: Aug. 11, 1980

[51] Int. Cl.³ .............................................. C01B 25/40
[52] U.S. Cl. ................................... 423/305; 252/135; 252/173; 252/DIG. 14; 423/307; 423/315
[58] Field of Search .................. 423/315, 305, 307; 252/135, 173, DIG. 14

[56] References Cited

U.S. PATENT DOCUMENTS

| | | | |
|---|---|---|---|
| 3,361,523 | 1/1968 | Yu Shen | 423/315 |
| 3,367,883 | 2/1968 | Stahlheber | 423/315 |
| 3,645,674 | 2/1972 | Heymer et al. | 423/305 |
| 4,207,197 | 6/1980 | Davis et al. | 252/135 |
| 4,228,025 | 10/1980 | Jacobsen | 252/135 |
| 4,228,043 | 10/1980 | Van den Brom | 252/173 |
| 4,233,172 | 11/1980 | McLaughlin et al. | 252/135 |

OTHER PUBLICATIONS

"STPP for Modern Detergents," paper presented at 7th annual meeting, Canadian Manufacturers of Chemical Specialties Association, Montreal, Canada (Oct. 27, 1964).

Primary Examiner—O. R. Vertiz
Assistant Examiner—Wayne A. Langel
Attorney, Agent, or Firm—Sim & McBurney

[57] ABSTRACT

Stable aqueous solutions of sodium polyphosphate useful in granulating dry solid cleaning composition components are formed by direct reaction of polyphosphoric acid with sodium carbonate generally at a temperature of about 50° C. The reactants are used in an Na:P ratio of 1.2:1 to 1.5:1, and the product solution contains about 32 to about 37% w/w $P_2O_5$ of which a high proportion is present as polyphosphate and has a pH of about 5 to about 6.5.

16 Claims, 1 Drawing Figure

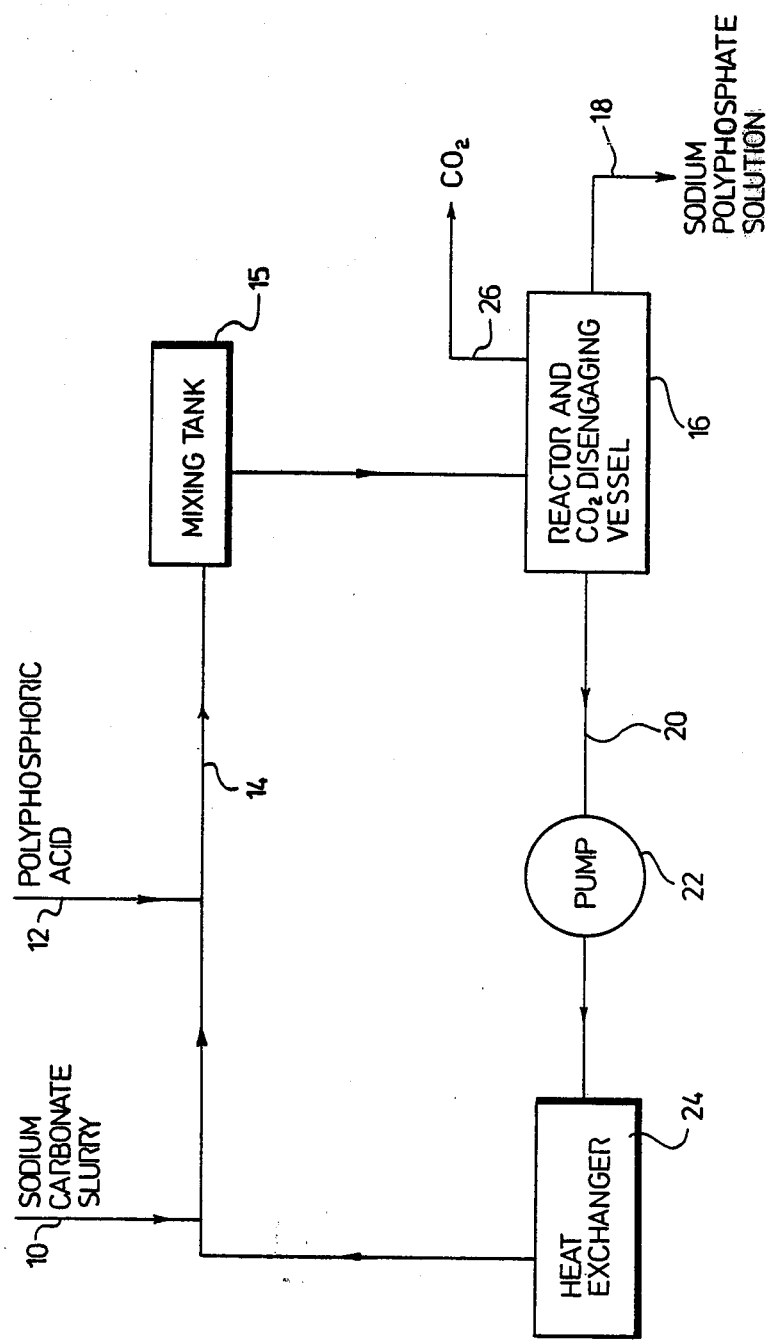

PRODUCTION OF SODIUM POLYPHOSPHATES

FIELD OF INVENTION

The present invention relates to the production of sodium polyphosphates.

BACKGROUND TO THE INVENTION

Sodium polyphosphates are widely used as a sequestering agent in various cleaning compositions. Solid sodium polyphosphate is conventionally produced by reacting orthophosphoric acid with sodium carbonate, drying the sodium orthophosphate so formed, and calcining the dried product to form the sodium polyphosphate. The calcining step which is used in this procedure requires considerable energy to effect.

SUMMARY OF INVENTION

The present invention is concerned with a procedure which enables the production of a relatively stable solution of sodium polyphosphates highly concentrated with respect to $P_2O_5$ content to be obtained, which is suitable for granulation of other cleaning composition components or which may be dried to form a solid sodium polyphosphate, without the necessity to utilize a calcining step and the energy involved therein.

In accordance with the present invention, sodium carbonate is reacted with polyphosphoric acid at a mole ratio of Na:P of about 1.2:1 to about 1.5:1 and at a pH of about 5 to about 6.5 to result in a sodium polyphosphate solution containing about 32 to about 37% w/w of $P_2O_5$.

The water present with the reactants, namely, the sodium carbonate and the polyphosphoric acid, is controlled so as to provide the required pH value and to result in the required $P_2O_5$ concentration in the product.

GENERAL DESCRIPTION OF INVENTION

The final $P_2O_5$ content of the product, ranging from 32 to 37% w/w, is critical in that if the $P_2O_5$ content is below the lower limit, solids precipitate from the product solution while if the $P_2O_5$ content is above the upper limit, the viscosity of the solution rises rapidly leading to lack of pumpability and inhibition of disengagement of carbon dioxide bubbles. A viscosity of solution in the range of about 50 to about 200 cps usually is acceptable.

It is preferred to provide the $P_2O_5$ content of the product solution as high as possible while preserving pumpability. The $P_2O_5$ content is preferably about 35 to about 37% w/w.

It is preferred to utilize as reactants polyphosphoric acid containing about 80 to about 85% by weight $P_2O_5$, since polyphosphoric acids of this concentration are commercially available and a slurry of sodium carbonate containing about 50 to about 55% $Na_2CO_3$, since such slurries are normally used in industrial operations involving sodium carbonate.

Other concentrations, however, may be used consistent with the requirement for a $P_2O_5$ range in the product of about 32 to about 37% w/w.

The reaction is effected with quantities of reactant corresponding to a ratio of Na:P of about 1.2:1 to about 1.5:1, preferably about 1.4:1. The pH of the reaction medium, and hence of the product, is another important parameter and must be controlled in the range of about 5 to about 6.5. If the pH value is above about 6.5, solidification of the solution occurs, while if the pH value is below about 5, the rate of hydrolysis of the polyphosphates, increases unacceptably. The highest pH compatible with liquid stability is preferred, i.e., about 6.4 to 6.5.

The temperature at which the reaction of the polyphosphoric acid and the sodium carbonate occurs is not critical but preferably is about 45° to about 50° C. to minimize hydrolysis of the polyphosphates. Higher temperatures accelerate hydrolysis of the polyphosphates while lower temperatures result in viscosity values which render the polyphosphates solution difficult to pump.

A temperature in the range of about 36° to about 45° C. for the sodium carbonate slurry prior to reaction, is preferred, since solid sodium carbonate is in the monohydrate form and is at or near its maximum solubility in this range.

The sodium polyphosphate solutions which result from this process preferably are characterized by at least about 75%, often over about 90%, of the $P_2O_5$ being present as polyphosphates of various chain lengths, depending on the strength of the initial acid. Lesser polyphosphate $P_2O_5$ values may be present but are less preferred, in view of the decreased sequestering properties of such products. The sodium polyphosphate solutions also have extended useful shelf-lives of at least several weeks.

The present invention, therefore, includes a novel sodium polyphosphate composition consisting of an aqueous solution of sodium polyphosphates characterized by:

(a) a $P_2O_5$ content of about 32 to about 37% w/w, (b) a mole ratio of Na:P of about 1.2:1 to about 1.5:1, and (c) a pH of about 5 to about 6.5.

The solutions may be used as a source of high $P_2O_5$-content liquid polyphosphates for a variety of purposes. For example, the solutions may be used as granulating liquids to make a variety of solid polyphosphate-containing cleaning compositions from solid building chemicals capable of hydrating and absorbing water, such as, sodium tripolyphosphate, trisodium phosphate, sodium carbonate, sodium sulphate, zeolites and nitrilotriacetic acid. If desired, a solid sodium polyphosphate may be recovered from the solution by spray drying.

The process of the invention, therefore, utilizes the direct reaction of sodium carbonate and polyphosphoric acid to form a sodium polyphosphate. The calcining step of the prior art and the energy requirements thereof are avoided. The sodium polyphosphate produced by this invention is in a unique stable liquid form, useful for granulation.

BRIEF DESCRIPTION OF DRAWING

The accompanying drawing is a schematic flow sheet of one embodiment of the process of the invention.

DESCRIPTION OF PREFERRED EMBODIMENT

Referring to the drawing, a slurry of sodium carbonate in line 10 and polyphosphoric acid in line 12 are separately fed into a recycle stream in line 14, which passes the reactants to a mixing tank 15 and then feeds the mixture to a reactor and carbon dioxide disengaging vessel 16, wherein the polyphosphoric acid and the sodium carbonate reactants react to form an aqueous solution of sodium polyphosphate and carbon dioxide produced in the reaction is disengaged from the liquid phase.

The liquid sodium polyphosphate product is removed by line 18. Recycle material is removed from the reactor tank 16 by line 20 and pumped by pump 22 through a heat exchanger 24 to remove excess heat of reaction and to recycle the same to the reactor tank 16 by line 14. Carbon dioxide gas disengaged from the liquid phase is vented from the vessel 16 by line 26.

EXAMPLES

EXAMPLE 1

Polyphosphoric acid containing 83.4% $P_2O_5$ was slowly added with stirring to a slurry of sodium carbonate in water containing 54.3% total $Na_2CO_3$. After reaction ceased, there was obtained a clear viscous solution which exhibited no tendency to crystallize after 10 days standing at ambient temperature (20° to 25° C.).

The solution was analyzed and the results of the analysis are as summarized in the following Table I:

TABLE I

| | |
|---|---|
| Total $P_2O_5$ | 36.0% w/w |
| $P_2O_5$ percent as ortho | 10.0% w/w |
| Viscosity at 40° C. | 200 cps |
| at 23° C. | 1060 cps |
| Density | 1.7 g/cc |
| pH | 5.8 |
| Na:P mole ratio | 1.34 |
| Sequestering value | 9.7g $P_2O_5$/g Ca |

A sample of the solution was pH adjusted by the addition of solid $Na_2CO_3$ to a pH of 7.0. Crystallization of solid phase sodium polyphosphate occurred rapidly.

EXAMPLE 2

An apparatus for the continuous production of product was set up utilizing the elements illustrated in the drawing. A series of four runs was carried out in the apparatus to produce product containing increasing proportions of $P_2O_5$. During the runs, the reaction temperature was controlled to about 45° C. and the pH was controlled in the range of 6 to 6.5.

The products obtained from the four runs were analyzed and the results of the analyses are summarized in the following Table II:

TABLE II

| | Run No. | | | |
|---|---|---|---|---|
| | 1 | 2 | 3 | 4 |
| Total $P_2O_5$ | 21.2 | 27.8 | 32.0 | 34.0 |
| % $P_2O_5$ as ortho | 10.0 | 5.0 | 9.0 | 9.0 |
| Na:P mole ratio | | | 1.406 | 1.385 |
| pH | | 6.5 | 6.5 | 6.2 |
| Specific gravity | 1.346 | 1.490 | 1.615 | 1.636 |
| Viscosity-cps | | | | |
| 25° C. | | | 250 | 370 |
| 35° C. | | | 96 | 160 |
| 45° C. | | | 50 | 87.5 |

The samples from the first two runs crystallized and hence viscosity determinations were not possible. The samples from the latter two runs exhibited stability against crystallization and were found to be useful in granulation of solid cleaning composition components.

SUMMARY OF DISCLOSURE

In summary of the disclosure of this application, the present invention provides novel sodium polyphosphate compositions which are produced by a novel procedure involving direct reaction between sodium carbonate and polyphosphoric acid. Modifications are possible within the scope of this invention.

What I claim is:

1. An aqueous solution of sodium polyphosphates which is stable to separation of a solid phase sodium polyphosphate and characterized by:
   (a) a $P_2O_5$ content of about 32 to about 37% w/w,
   (b) a mole ratio of Na:P of about 1.2:1 to about 1.5:1, and
   (c) a pH of about 5 to about 6.5.

2. The solution of claim 1 wherein at least about 75% w/w of the $P_2O_5$ is present as polyphosphates of varying chain lengths.

3. The solution of claim 1 wherein at least about 90% w/w of the $P_2O_5$ is present as polyphosphates of varying chain lengths.

4. The solution of claim 1 wherein said mole ratio is about 1.4:1.

5. The solution of claim 1 wherein at least about 90% w/w of the $P_2O_5$ is present as polyphosphates of varying chain lengths, said mole ratio is about 1.4:1 and said pH is about 6.4 to 6.5.

6. The solution of claim 1, 2 or 4 wherein said pH is about 6.4 to 6.5.

7. A process for the production of an aqueous solution of a sodium polyphosphate, which comprises reacting polyphosphoric acid and sodium carbonate in such proportions as to provide an Na:P ratio in the range of about 1.2:1 to about 1.5:1, such reaction being effected at a pH of about 5 to about 6.5 in the presence of water in quantities such as to provide a product solution containing about 32 to about 37% w/w of $P_2O_5$.

8. The process of claim 7 wherein said water is introduced only with the reactants which are utilized in the form of polyphosphoric containing about 80 to 85% w/w $P_2O_5$ and a slurry of sodium carbonate containing about 50 to about 55% w/w $Na_2CO_3$.

9. The process of claim 7 wherein said proportion of reactants are such as to provide an Na:P of about 1.4:1.

10. The process of claim 7, 8 or 9 effected at a temperature of about 45° to about 50° C.

11. The process of claim 10 wherein said slurry of sodium carbonate has a temperature of about 36° to about 45° C.

12. A continuous process for the production of an aqueous solution of sodium polyphosphate, which comprises:
   continuously feeding a slurry of sodium carbonate of concentration about 50 to about 55% w/w $Na_2CO_3$ into a recycle stream at a temperature of about 36° to about 45° C.,
   continuously feeding polyphosphoric acid having a $P_2O_5$ content of about 80 to 85% into said recycle stream following said feeding of sodium carbonate slurry thereto,
   mixing said sodium carbonate slurry and said polyphosphoric acid to form a reaction mixture,
   continuously forwarding said reaction mixture to a reaction zone to permit reaction of said polyphosphoric acid with said sodium carbonate to occur,
   continuously controlling the relative proportions of polyphosphoric acid and sodium carbonate fed to said recycle stream to provide a mole ratio of Na:P of about 1.2 to about 1.5:1 and a pH of about 5 to about 6.5 in said reaction mixture,
   continuously venting carbon dioxide formed in said reaction from said reaction zone, continuously withdrawing a portion of the unreacted reaction mixture from said reaction zone as a product stream of aqueous solution of sodium polyphosphate containing about 32 to about 37% w/w of $P_2O_5$, continuously removing the remainder of said reacted reaction mixture from said reaction zone as said recycle stream, and subjecting said recycle stream to heat exchange to maintain the reaction temperature prior to said feeding of sodium carbonate slurry thereto.

13. The process of claim 12 wherein the reaction temperature is about 45° to about 50° C.

14. The process of claim 12 wherein said Na:P mole ratio is about 1.4:1.

15. The process of claim 12 wherein said pH is about 6.4 to 6.5.

16. The process of claim 12 wherein the reaction temperature is about 45° to about 50° C., said Na:P mole ratio is about 1.4:1 and said pH is about 6.4 to 6.5.

* * * * *